Figure 1:
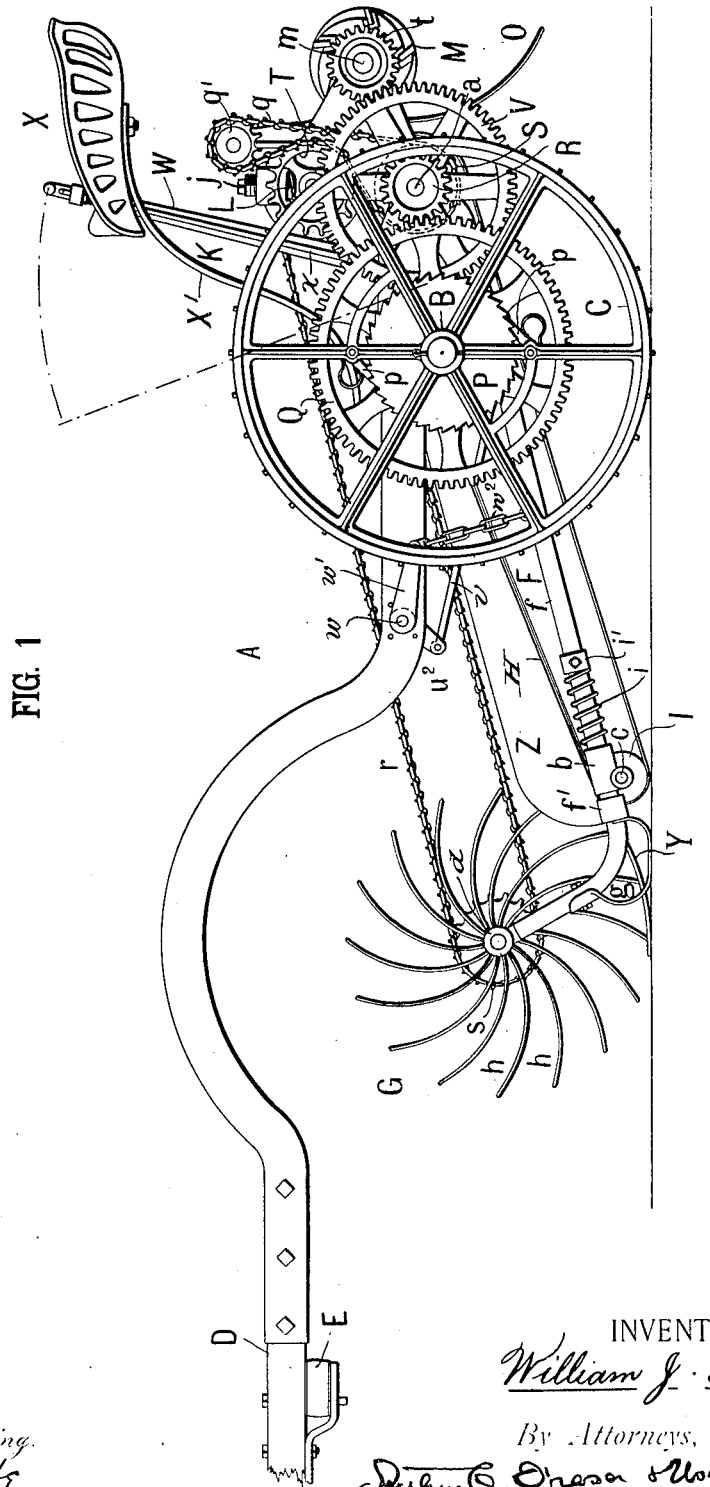

No. 885,486. PATENTED APR. 21, 1908.
W. J. KENT.
MACHINE FOR CUTTING SUGAR CANE TRASH, &c.
APPLICATION FILED MAR. 13, 1907.

4 SHEETS—SHEET 2.

WITNESSES:

INVENTOR:
William J. Kent,
By Attorneys.

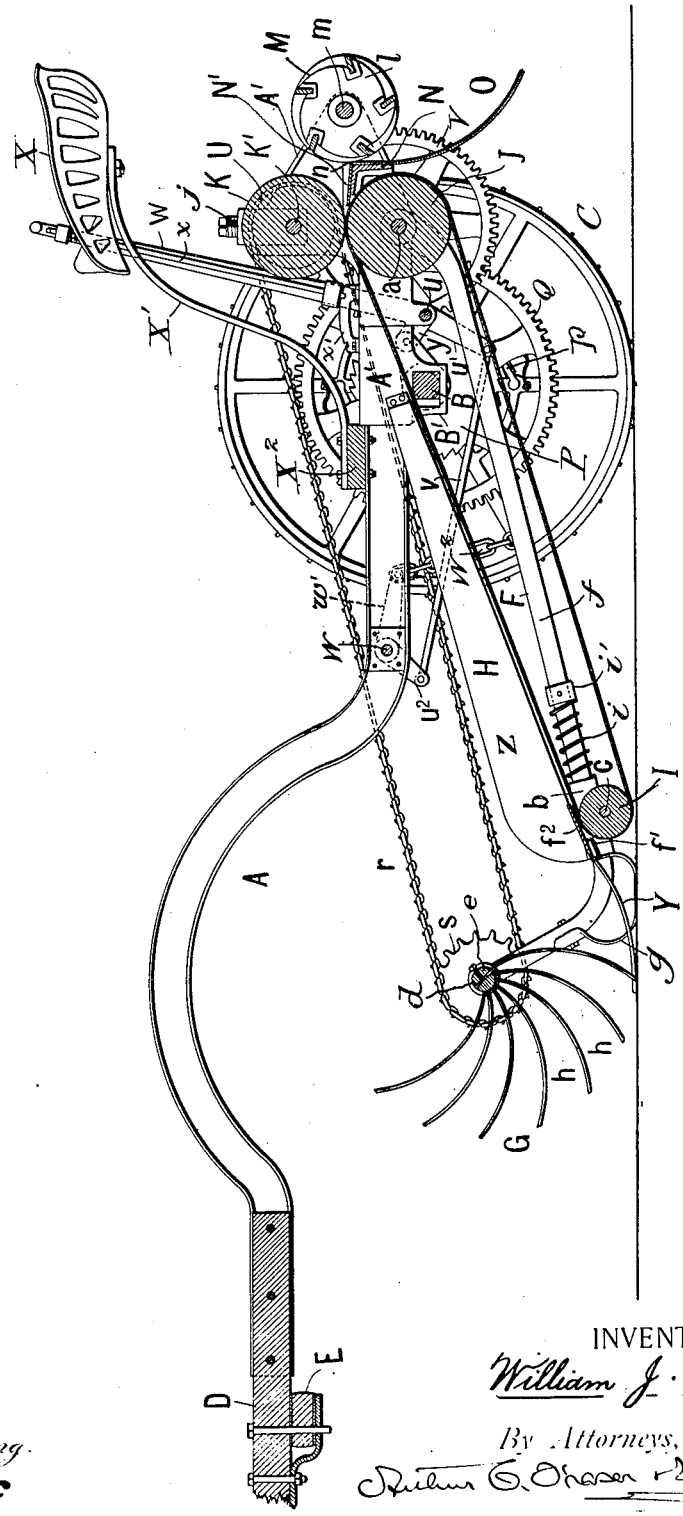

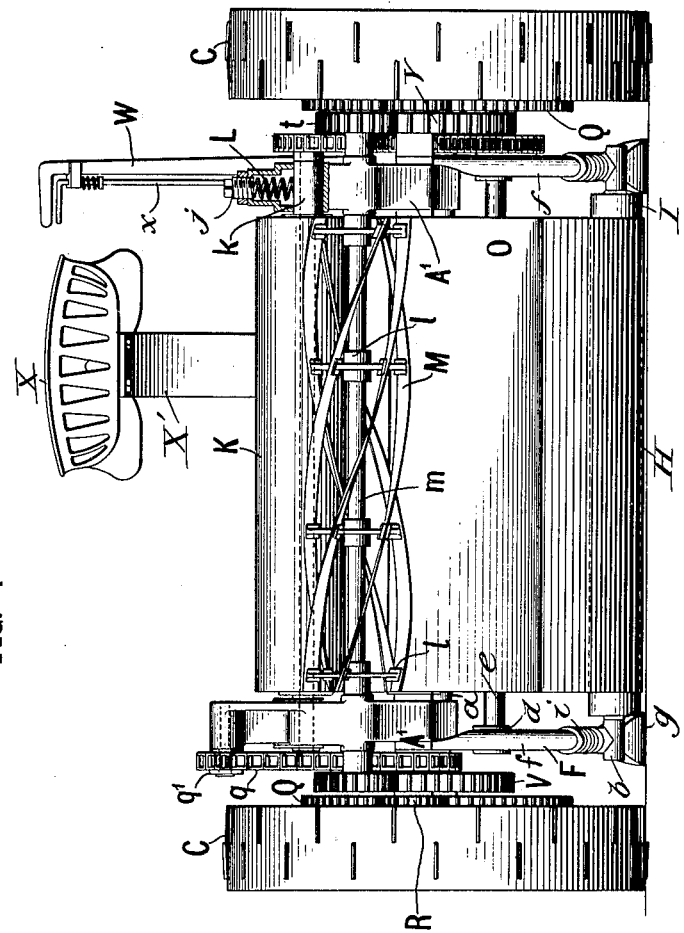
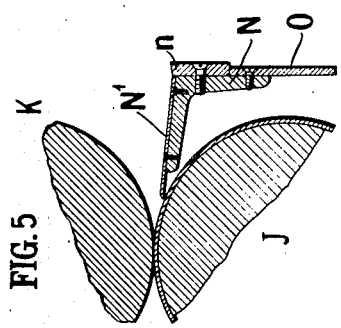
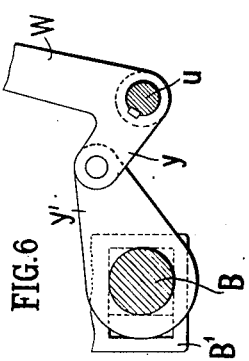
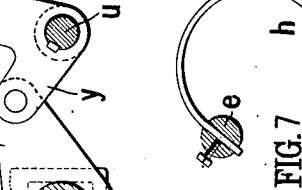

UNITED STATES PATENT OFFICE.

WILLIAM J. KENT, OF NEW YORK, N. Y.

MACHINE FOR CUTTING SUGAR-CANE TRASH, &c.

No. 885,486.  Specification of Letters Patent.  Patented April 21, 1908.

Application filed March 13, 1907. Serial No. 362,231.

*To all whom it may concern:*

Be it known that I, WILLIAM J. KENT, a citizen of the United States, residing in the borough of Brooklyn, county of Kings, city of New York, N. Y., have invented certain new and useful Improvements in Machines for Cutting Sugar-Cane Trash, &c., of which the following is a specification.

This invention aims to provide a practical apparatus, which in moving through a sugar cane field after the canes have been cut and removed, will pick up from the ground the tangled mass of leaves and cane tops called "trash," lift to a cutter, and cut them into small pieces which are dropped back on the ground so that they may be plowed under as a fertilizer. Some efforts have been made to devise machines for this purpose, but heretofore, so far as I am aware no machine has been produced which is capable of successfully picking up this material from the ground and feeding it to a cutter. The fertilizing value of the trash, if successfully reduced to a condition which will admit of plowing, and which before plowing will not obstruct the percolation of rain into the soil, is very great. It is nevertheless the general and as I believe the invariable practice to burn this refuse as soon as it has become sufficiently dry, a process which is attended with the disadvantage of losing the entire value of the nitrogenous constituents of the trash as a fertilizer, and of injuring the cane roots, so as to impair their capacity to send up new shoots the following season.

According to my invention I mount upon a suitably constructed vehicle a revolving rake at the front thereof, which turns backwardly so as to sweep the ground in rearward direction, whereby to pick up and disentangle the trash, and sweep or throw it onto a conveyer in rear of said rake by which the material is carried rearwardly and elevated sufficiently to bring it to the feeding and cutting mechanism; the feeding device consists of a pair of rolls between which the layer of trash enters and by which it is squeezed, compacted and crushed, and fed regularly to a revolving cutter, the blades of which, by acting against a fixed blade, shear or chop the material into fine pieces. As the cutter blades are disposed transversely to the path of movement of the material, it is important that the material shall be so presented as to enter between the rollers in endwise or longitudinal manner, in order that the leaves and stalks or canes may be cut or chopped off transversely, rather than longitudinally. It is to the attaining of this result that my invention is especially directed, it being found that in prior attempts the trash would, in the act of picking it up, be presented transversely to its movement, except to the extent that the tangled mass was not materially rearranged, and hence the cutting would be largely ineffective. To this end the revolving rake is especially constructed so as to have the novel function of straightening out and turning endwise the leaves and cane tops in the act of transferring them from the ground to the conveyer.

The invention comprises also certain other features of improvement applicable to machines of this character.

The accompanying drawings show my invention in its preferred embodiment.

Figure 2:
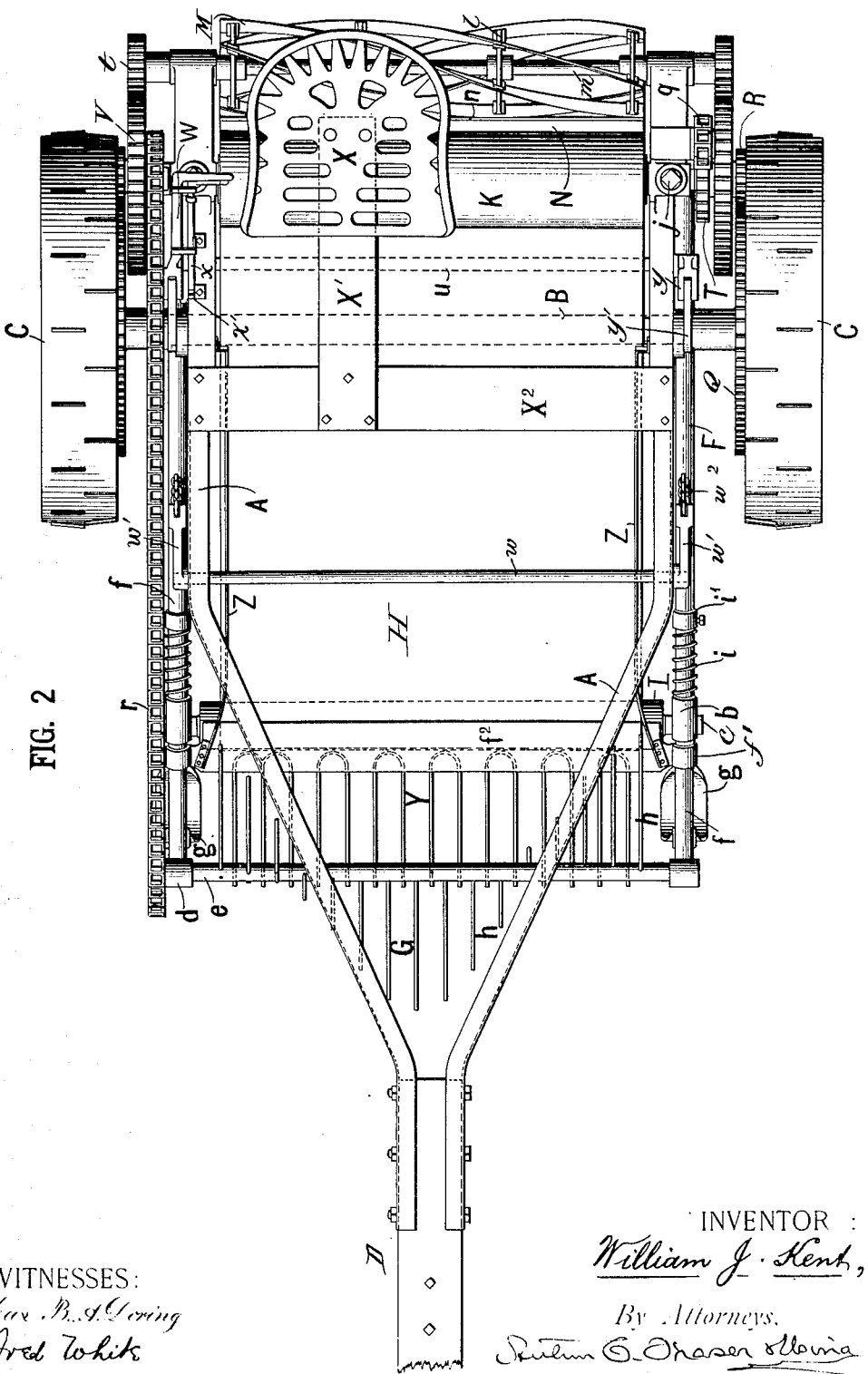

Figure 1 is a side elevation of the machine; Fig. 2 is a plan thereof; Fig. 3 is a vertical mid-section, viewed from the same side as Fig. 1; Fig. 4 is a rear elevation; Fig. 5 is a fragmentary detail in vertical section; Fig. 6 shows the toggles detached; Fig. 7 shows a modification of the rake teeth.

Referring to the drawings, the machine is shown as adapted to be drawn by horses, but it is to be understood that other power may be substituted. The machine shown comprises a main frame A which is supported near its rear upon an axle B, on the ends of which are draft wheels C, C. The front of the frame may be supported in any suitable manner; it is shown as connected rigidly to the pole D which passes between the horses in the usual manner, and to which is pivoted the whiffle tree E.

The frame A may be variously constructed, being shown as formed of two channel irons, the rear portions of which are widely separated and parallel, their front portions being drawn closely together to embrace the pole D which is clamped between them (Fig. 2), and their intermediate portions being arranged to converge obliquely.

At some convenient point a supplemental or swing frame F is hung to the main frame A. The function of this swing frame is to carry the bearings of the revolving rake G and to support the front portion of the conveyer H. In the precise construction shown, the swing frame F is pivoted at its rear end upon an axis $a$, extends thence forward and downward, being provided with bearings $b$ for an axle or shaft $c$, and having its forward portion turned upwardly to carry bearings $d$ for a transverse shaft $e$ forming part of the rake G. The frame F is shown as formed of tubular side members $f, f$, their lower forward portions being provided with suitable supports $g, g$ adapted preferably to run or slide upon the ground; these supports $g, g$ are shown as runners or shoes, but, of course, rollers or caster wheels could be substituted, as is common in agricultural machinery. The side members $f, f$ are transversely connected by a cross bar $f'$.

The rake G is shown as constructed of the horizontal transverse shaft $e$ and with curved elastic rake teeth $h, h$ projecting therefrom. The specific construction and arrangement of these teeth will be described later.

The conveyer H may be of any construction adapted to receive the material thrown on to it rearwardly from the rake, and to cause this material to travel rearwardly, at the same time lifting it sufficiently to bring it properly to the feed rolls and the cutter. The conveyer is shown as consisting of an endless belt or apron which may be of canvas or other textile fabric, or of wire cloth, or may be a slatted apron, or otherwise. As shown, the apron is stretched over two rollers I and J; the roller I is mounted on the transverse shaft $c$, as close to the ground as is practicable; the roller J turns upon the transverse axis $a$ and power is applied to turn it and thereby drive the apron. To keep the apron stretched, its lower bearings $b$ are made to slide upon the side members $f$, and are pressed forward by stiff compensating springs $i$ reacting against collars $i'$ which may be set or adjusted to give the springs the requisite stress.

The feed rollers are marked J, K. Preferably the lower of these is the same roll J around which the apron is carried, so that the apron, with its layer of material, passes between the rolls. Preferably both rolls are positively driven by suitable power, so as to engage the layer of material on opposite sides thereof, and avoid any tendency to slip, or fail to feed forward the material. This is especially important in view of the varying thickness of the layer of trash, and the frequent occurrence of tops or pieces of cane of considerable thickness. It is important that these should be drawn unfailingly between the rolls so as to be crushed and flattened thereby, both in order to facilitate their being chopped across by the cutter, and in order to render them more easily permeable by moisture when buried in the soil, so as to hasten their decay and conversion into suitable plant food. The upper roller K is pressed strongly against the lower one by means of suitable springs L, L, preferably arranged in housings and pressing down upon the bearing boxes $k, k$ of the roll shaft K', their stress being adjusted by screws $j, j$.

In the rear of the feed rolls is the cutter M. This is best made as a revolving cutter having spiral knives or shear blades, of the well known type. Its blades require to be strongly supported at frequent intervals by hub-disks $l, l$ fixed on its shaft $m$. The blades act with a shearing cut against a fixed blade $n$ which is rigidly supported on any suitable transverse member N of the main frame A. This is shown as an angle iron, its upper flange forming or supporting a stripper or plate N' (Fig. 5) onto which the crushed material passes from between the rolls, at which point the material separates from the apron, the material passing over this plate, and the apron clinging to the roll and passing under it. The material that is chopped up by the cutter immediately falls therefrom on to the ground. To properly direct it, it is preferable to provide a shield O of thin metal, which is shown as forming a downward continuation of the fixed knife $n$. This shield vibrates freely and helps to distribute the trash.

The several operative parts are driven at suitable relative velocities by any appropriate or convenient gearing. In the case of a draft vehicle, as shown, it is preferable to drive the active parts from the wheels C, C. For this purpose, these wheels, which turn loosely on the axle B, carry pawls $p, p$ (Fig. 1) which engage the teeth of ratchet wheels P, P, so as to propel them when turning forward, but slip when turning backward. The ratchet wheels are integral with or united fixedly to gear wheels Q, Q; these mesh with and drive gear wheels R, R fixed on the opposite ends of the shaft or axle $a$, so that by this means the conveyer roll J is driven. On this shaft $a$ is fixed a sprocket wheel S, which drives a chain $q$, supported on an idler $q'$ and engaging a sprocket wheel T fixed on the shaft K' of the upper feed roll K, so that this roll is positively driven in the contrary rotative direction to the roll J, and at the same surface speed. The shaft K' of this roll carries on its opposite end a sprocket wheel U which, through a long chain $r$, drives a sprocket wheel $s$ fixed on one end of the rake shaft $e$. Thus through the reversal of motion effected by the chain $q$, the rotary rake G is driven in the proper backward direction. Its speed, of course, may be varied as required under different conditions by varying the relative sizes of the sprocket wheels U and $s$. For driving the cutter M at the desired accelerated speed, a gear wheel V is applied preferably at each end of the shaft $a$, these gears being preferably made integral with the gears R, R; on the ends of the cutter shaft $m$ are fixed pinions $t$, $t$ which mesh with the gears V, V.

It is at times necessary to lift the swing frame F, and its supported parts, to enable them to clear stones, stumps or other obstructions; it is also desirable to travel with these parts lifted in going to or from the cane field. When thus lifted it is desirable that the gearing be disconnected so that the working parts be not driven. To accomplish these purposes I provide a lifting lever W at one side of the machine, with its handle in convenient proximity to the driver's seat X. This lever is fixed upon a transverse shaft $u$ which has bearings in the main frame A. At one or both ends of this shaft is fixed a downwardly projecting lever arm $u'$ (Fig. 3) which connects by a rod $v$ with a similar lever arm $u^2$ fixed on another transverse shaft $w$, on the opposite ends of which are fixed lever arms $w'$ which connect by chains (or rods or other connections) $w^2$ with the side members $f, f$ of the swing frame F. Thus as the lever W is pushed forward, the rod $v$ is pulled, the shaft $w$ rocked, the arms $w'$ elevated, and the swing frame F lifted. For holding the lever W in either its backward or forward position, it is provided with a locking rod $x$ of usual construction, the lower end of which serves as a bolt, entering one or other of two (or more) notches in a fixed locking sector $x'$.

For simultaneously disconnecting the gearing upon the lifting of the frame F, I preferably provide means whereby the movement of the lever, or of the frame, separates the gear wheels Q, Q from the gear wheels or pinions R, R. Since all the power for driving the machine is transmitted to and through the gears R, R, it results that by separating the respective gears so that they cease to mesh, the driving wheels run free, and the working parts are no longer driven. This separation may be variously accomplished. One suitable means is that shown, where the main axle B is displaced from or toward the shaft $a$ sufficiently to bring the gear teeth out of or into mesh. In the construction shown the axle B, which is square and non-rotative, is housed in a hanger B' (Fig. 3) near each end, which affords the required amount of play to permit the axle to move or slide bodily forward from the position shown a distance slightly greater than the depth of the teeth. In normal running the axle occupies the position shown; but upon moving the lever W forward, the axle is pushed forward in its housings to disconnect the gears. The mechanical connecton for accomplishing this consists preferably of a pair of toggles or knuckle joints at each side of the machine; these toggles comprise arms $y$, $y$ fixed at opposite ends to the rock shaft $u$ and links $y'$ jointed to them and engaging the round parts or end portions of the axle B. In normal running the toggles are bent as shown in Figs. 3 and 6, but on the lifting of the swing frame, the toggles are straightened to displace the axle and throw the gears out of mesh.

The seat X is or may be supported in a usual manner upon a spring bracket X' fastened to a cross plank X² fixed on the main frame.

For successful operation the special construction of the rake G, and its relation to the conveyer H is important. The operation of a machine for the purpose contemplated by my invention is attended with two serious difficulties: first, that the irregular and tangled mass of cane leaves and tops, which has been trampled upon and driven over so as to compact it and press it partly into the ground, and which is often sodden from rain, is very difficult to pick up from the ground; and second, that in the effort to pick it up and transfer it to cutting mechanism, by any means heretofore invented, a large proportion of the leaves and cane tops are caused to travel transversely of the machine, or nearly so, so that they are nearly parallel with the line of cutting action of the knives, which consequently either split them longitudinally, or cut them at a very acute angle, instead of chopping them transversely into short pieces, as is desirable and practically essential to enable them to be readily plowed under and to rot, so as not to interfere with the subsequent cultivation of the soil. Hence my invention is particularly directed to the provision of an adequate and effective means for separating and disentangling the mass of trash upon the ground, and as it were combing it out, and arranging its component leaves and stalks in approximately endwise direction and transferring them in such position onto the conveyer, in order that they may be fed end-on between the rolls and to the cutter. To these ends I aim particularly to avoid any pushing forward of the trash while on the ground; on the contrary I make provision for rapidly and forcibly seizing the rearward edge or fringe of the mass and separating and straightening its components by the individual action of essentially single arms or teeth.

I have found that if two or more teeth act together in the same horizontal transv rse line so as to seize simultaneously the same leaf or cane, they tend to throw it bodily onto the conveyer in transverse position; to avoid this result I so arrange the teeth that no two of them shall occupy the same transverse line sufficiently near together to simultaneously engage the same leaf or cane; and I arrange the teeth to act in such angular succession as shall avoid as far as possible, any simultaneous action of two teeth upon the same component portions of the trash. I thus cause each rake tooth to act separately and individually, to substantially the same effect as if the rake carried no other teeth. Thus each tooth in its rapid backward movement encounters and penetrates the rearward edge of the mass of trash, and first combs it out so to speak into a sort of fringe directed longitudinally backward, and by repeated blows separates the leaves and tops and sweeps them backwardly onto the traveling apron, keeping them directed longitudinally, or nearly so; acting in these respects as efficiently as if the other teeth were not present. Within these requirements the teeth may be variously arranged, but I find it preferable to dispose them around the shaft e in a steep spiral, as shown. This spiral should be so steep that the successive tips of the teeth occupy an acute angle to the direction of their movements, so that even should the same leaf or cane be caught by two successive teeth, their united action cannot turn the leaf or cane into a position approximating a transverse direction, but must direct it either longitudinally or to an acute angle with the direction of travel of the conveyer.

It is practically important that the rake teeth, while being stiff enough to readily penetrate the trash, shall yet be sufficiently yielding or resilient to enable them upon striking stones, cane roots, or other obstructions, to deflect without lifting or forcing up the entire rake and thereby lifting the other teeth thereof out of action. To this end the teeth are made of highly elastic steel rods, and are bent or curved sufficiently to insure their further flexure to a suitable extent upon striking obstacles. The teeth may be more or less bent to give the desired elasticity. It is important that their ends be inclined somewhat backwardly to assist in disentangling them from the trash as they swing up, and to coöperate with centrifugal force in throwing the trash off from the teeth onto the apron. A suitable curve is that shown in Figs. 1 and 3. Where greater springiness is desirable, as for working over very uneven ground, the teeth may advantageously be bent to a sharper curve (in Fig. 7). The teeth may be fastened to the shaft e in any convenient way, as by inserting them in transverse holes therein and fastening them by set screws.

Some means is requisite for assisting the upward movement of the trash to lift it onto the lower end of the conveyer or apron H, as otherwise a greater or less proportion of the trash will be thrown against the roller I, or under it, and would fall to the ground and pass under the machine. Such proportions would be less as the roller I is made smaller and runs closer to the ground. With a small low roller and suitably shaped rake teeth, but a small proportion of trash would be thus lost; but in any case it is desirable to have something in the nature of an inclined plane up which the rake may sweep the trash onto the apron. Preferably I construct this as a skeleton inclined plane, or comb Y, fastened at its rear portion to the swing frame F, and having its teeth or fingers projecting forwardly and downwardly into contact with the ground, or substantially so. These fingers should be slightly upturned at their forward ends to facilitate riding over obstacles, but not so much as to direct the trash beneath them. They should approximate an arc coincident with the path of travel of the tips of the rake teeth. I have shown these fingers as formed in pairs (Fig. 2) with their bends confined between two transverse plates constituting the cross member f' of the frame F. Of these the upper plate f² extends rearwardly over the top of the roller I, to guard against the material dropping down in front of this roller.

It is preferable to provide side guards to prevent the trash which is thrown backwardly onto the conveyer from running off the sides thereof. For this purpose I provide guards Z, Z, consisting of plates arranged in substantially vertical planes, supported from the swing frame F, and projecting slightly inside the edges of the apron.

The speed of the rotary rake is a matter of importance, in order that its teeth may sweep the ground rearwardly at a speed sufficiently greater than the forward travel of the machine to effectively disentangle and draw out the mass of trash. With gearing relatively proportioned as shown in the drawings, a suitable speed is attained; but it is to be understood that this speed may be varied within wide limits without departing from my invention; and it is desirable that the speed ratio be made variable by supplying interchangeable sprockets for the chain r.

My invention is not necessarily limited to the use of a revolving rake G or a revolving cutter M. But it is preferable for simplicity to make these parts revolve instead of reciprocate. For the rake it is only essential that the teeth, after moving forward in any suitable way, shall descend into contact with the trash and engage it with a backward sweeping or pitchfork motion at sufficient speed to separate it and sweep or throw its component parts back onto the conveyer.

That feature of my invention whereby the rake teeth act individually with the effect of straightening the trash and presenting its components in approximately longitudinal order to the action of the cutter, does not necessarily involve that the rake teeth shall strike backwardly from above upon the trash; as I have demonstrated that under suitable conditions it is possible to lift the trash and cause the rake teeth to act upon it with an upward and rearward motion; in other words it is possible to turn the revolving rake end for end and reverse its motion, so that it shall lift the trash and carry it over the rake while separating it and straightening its leaves and tops, but this involves much greater complication and difficulty, and is greatly inferior to the construction and arrangement shown.

It will be understood that the frame A may have any suitable construction for providing bearings for the shafts $a$, $K'$, $m$ and $u$. In the construction shown this is provided for by means of castings $A'$, $A'$ fastened to the respective channel irons, and shaped to form the several bearings, as well as the housing $B'$ for the axle, and the housings for the springs L, L.

My machine is not necessarily limited in its use solely to cane trash, but may be used for picking up and cutting any analogous material, such as a tangled mass of leaves or leaves and stalks.

It is to be understood that my invention is susceptible of considerable modification, and that certain parts thereof may be useful independently of the other parts or elements constituting the complete machine.

I claim as my invention the following defined novel features and combinations, each substantially as hereinbefore set forth, namely:

1. In a machine for the purposes set forth, a frame, means adapted to pick up material from the ground and direct it longitudinally, a conveyer for receiving such material and feeding it longitudinally, and a cutter to which it is fed thereby.

2. In a machine for the purposes set forth, a frame, a conveyer, and means adapted to pick up material from the ground and lay it longitudinally on the conveyer, combined with feed rolls and a cutter.

3. In a machine for the purposes set forth, a frame, a conveyer, a fixed comb in front of the conveyer, and means coöperating with such comb to gather up material from the ground and lay it longitudinally on the conveyer, combined with feed-rolls and a cutter.

4. In a machine for the purposes set forth, a frame, a conveyer, and a rake sweeping the ground rearwardly and adapted to pick up material and lay it longitudinally on the conveyer, combined with feed-rolls and a cutter.

5. In a machine for the purposes set forth, a frame, a conveyer, and a rake having teeth adapted to penetrate with a downward movement a mass of material upon the ground, and by a rearward movement to disentangle and straighten such material and throw it longitudinally upon the conveyer, combined with feed-rolls and a cutter.

6. In a machine for the purposes set forth, a frame, a conveyer, and a rake having individually acting teeth adapted to penetrate a mass of material upon the ground, and by a rearward movement to disentangle and straighten such material and throw it longitudinally upon the conveyer, combined with feed-rolls and a cutter.

7. In a machine for the purposes set forth, a frame, a conveyer, and a revolving rake having its teeth transversely isolated so as to act individually upon a mass of material upon the ground, and adapted to disentangle and straighten such material and throw it longitudinally on the conveyer, combined with feed-rolls and a cutter.

8. In a machine for the purposes set forth, a frame, a conveyer, and a revolving rake having transversely isolated teeth arranged spirally in a line forming an acute angle to their direction of movement, whereby they act individually upon a mass of material upon the ground, and adapted to disentangle and straighten such material and throw it longitudinally on the conveyer, combined with feed-rolls and a cutter.

9. In a machine for the purposes set forth, a frame, a conveyer, and a revolving rake having resilient curved teeth adapted to penetrate with a downward movement a mass of material upon the ground, and to yield individually to obstacles without displacing the rake as a whole, and to throw the material longitudinally on the conveyer, combined with feed-rolls and a cutter.

10. In a machine for the purposes set forth, a frame, an endless belt conveyer, means adapted to pick up material from the ground and lay it longitudinally on the conveyer, a pair of feed rolls and a cutter, said conveyer belt passing around one of said feed rolls, whereby it feeds the material positively to the rolls and cutter.

11. In a machine for the purposes set forth, a vehicle frame, a swing frame hung therefrom, an endless conveyer carried by said swing frame, and means adapted to pick up material from the ground and lay it longitudinally on the conveyer, also carried by said swing frame, combined with feed rolls and a cutter 12. In a machine for the purposes set forth, a vehicle frame, a swing frame hung therefrom, a rake and conveyer carried by said swing frame, the rake adapted to pick up material from the ground and lay it longitudinally on the conveyer, and a lifting lever connected to elevate said swing frame, rake, and conveyer, combined with feed rolls and a cutter.

13. In a machine for the purposes set forth, a vehicle frame, a swing frame hung therefrom, a rake and conveyer carried by said swing frame, the rake adapted to pick up material from the ground and lay it longitudinally on the conveyer, driving means for said rake and conveyer, a lifting lever connected to elevate said swing frame, and means adapted upon the operation thereof to simultaneously disconnect said driving means.

14. In a machine for the purposes set forth, the combination of the main frame, axle and wheels, of a vehicle, a conveyer, means adapted to pick up material from the ground and lay it longitudinally on the conveyer, feed rolls, a cutter, driving mechanism for driving the operative parts from the vehicle wheels comprising a gear wheel carried by the axle, and a second gear wheel driven from the first and carried by a shaft, said axle and shaft relatively movable to bring said gears into or out of mesh, and a controlling lever adapted to effect such movements, whereby to connect or disconnect the driving mechanism.

15. In a machine for the purposes set forth, a frame, an endless belt conveyer, means adapted to pick up material from the ground and lay it longitudinally on the conveyer, a pair of feed rolls and a cutter, said conveyer belt passing around one of said feed rolls, whereby it feeds the material positively to the rolls and cutter, and a stripper plate adapted to receive the material emerging from between said rolls, separate it from the apron, and transfer it to the cutter.

16. In a machine for the purposes set forth, the combination of a moving vehicle, means adapted to pick up material from the ground and direct it longitudinally, a pair of feed rolls receiving such material, a cutter to which it is fed by said rolls, and driving means for said rolls comprising sprocket wheels on the roll shafts, an idler sprocket, and a chain passing around one of said roll sprockets and said idler, and held by the latter in engagement with the other roll sprocket to insure the positive driving of the rolls irrespective of their varying separation.

17. In a machine for the purposes set forth, the combination of a vehicle frame, a conveyer, a revolving rake adapted to pick up material from the ground and lay it longitudinally on the conveyer, feed rolls, a cutter, and driving mechanism comprising means for turning one of said rolls, gearing for positively driving the other roll therefrom in contrary direction, a sprocket wheel on the shaft of the latter roll, a sprocket wheel on the rake shaft, and a chain connecting said sprocket wheels.

18. In a machine for the purposes set forth, the combination of a vehicle frame, an endless belt conveyer, means adapted to pick up material from the ground and lay it longitudinally on the conveyer, feed rolls, and a cutter, with yielding means for stretching said conveyer belt.

19. In a machine for the purposes set forth, the combination of a vehicle frame, an endless belt conveyer, means adapted to pick up material from the ground and lay it longitudinally on the conveyer, feed rolls, and a cutter, with guides mounted at the sides of the conveyer to prevent the material escaping from its edges.

In witness whereof, I have hereunto signed my name in the presence of two subscribing witnesses.

WILLIAM J. KENT.

Witnesses:
ARTHUR C. FRASER,
FRED WHITE.